W. A. HUBENER.
NUT LOCK.
APPLICATION FILED AUG. 31, 1916.
1,240,046.
Patented Sept. 11, 1917.
2 SHEETS—SHEET 1.
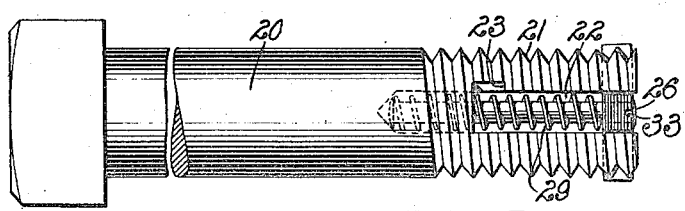
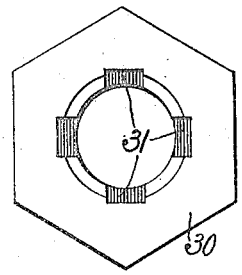
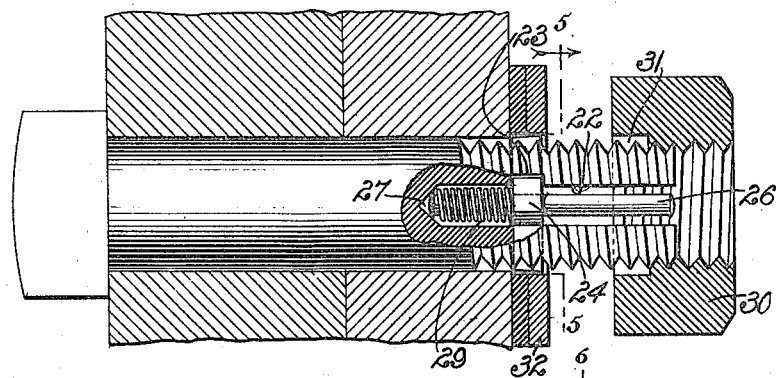
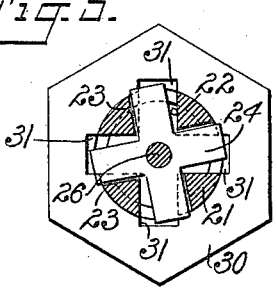
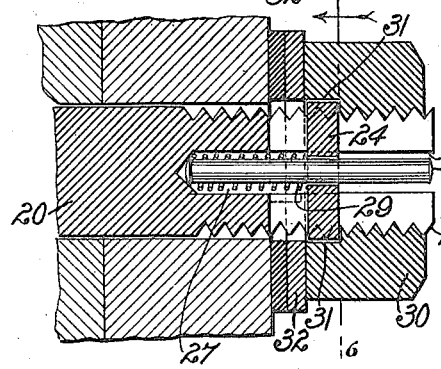
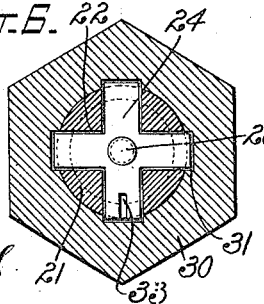
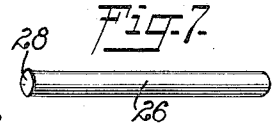
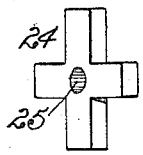
WITNESSES
INVENTOR
W. A. Hubener
BY
ATTORNEYS

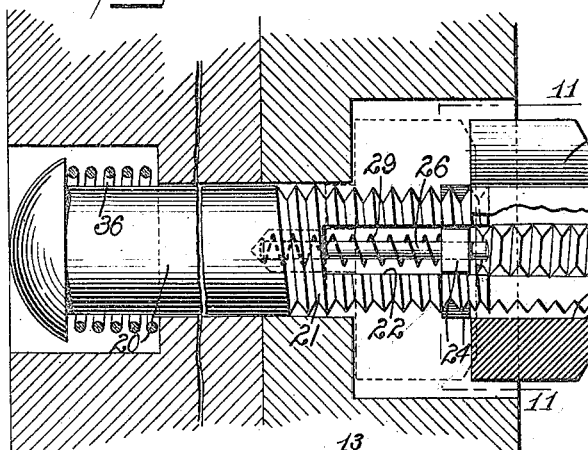
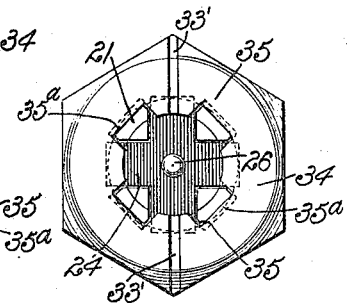
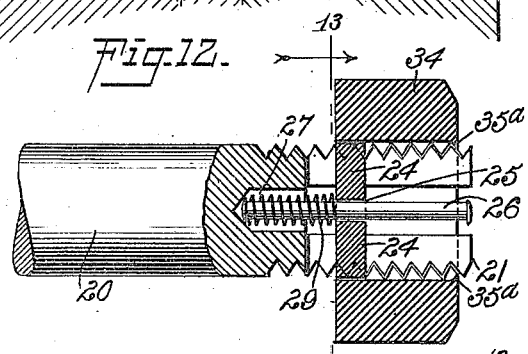
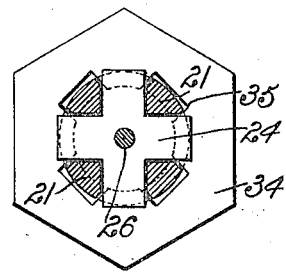
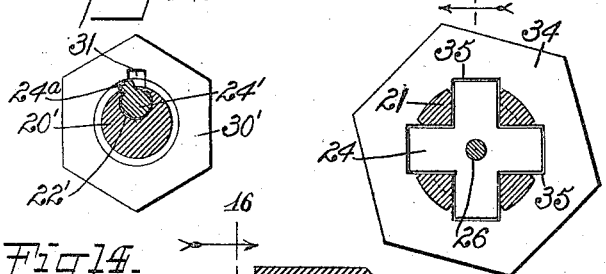
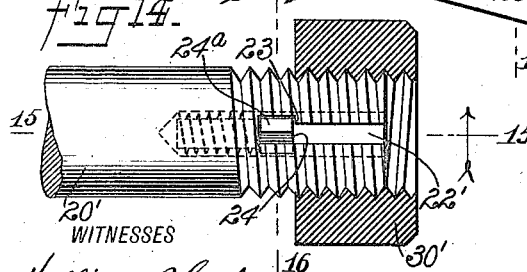
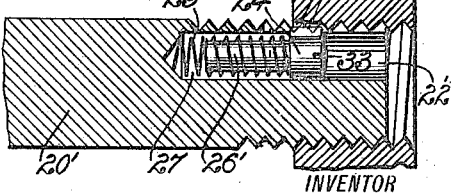

UNITED STATES PATENT OFFICE.

WILLIAM ALOYSIUS HUBENER, OF NEW YORK, N. Y.

NUT-LOCK.

1,240,046.  Specification of Letters Patent.  Patented Sept. 11, 1917.

Application filed August 31, 1916.  Serial No. 117,877.

*To all whom it may concern:*

Be it known that I, WILLIAM ALOYSIUS HUBENER, a citizen of the United States, and a resident of the city of New York, borough of Manhattan, in the county and State of New York, have invented a new and Improved Nut-Lock, of which the following is a full, clear, and exact description.

This invention relates to nut and bolt locks and has particular reference to novel and peculiar means for locking a nut or its equivalent from removal by inadvertence or the like from a bolt.

Among the objects of the invention is to provide a threaded bolt with a longitudinal slot or keyway and a spring operated key movable longitudinally of said slot or keyway into position to obstruct and prevent the removal of a nut threaded to coöperate with the bolt.

By the term "bolt" as employed herein, I mean to fairly cover any analogous device, such as a rod, shank or other attaching means adapted to be so secured in place in a support as to be safe from inadvertent or accidental removal, and likewise by the term "nut" I mean to cover any analogous device such as a head or other keeper coöperating with the bolt to prevent the endwise movement of the bolt from the support.

Among the objects of the invention, therefore, is to provide a locking device for a nut which will constitute positive means to prevent relative rotation between the nut and bolt, but which will permit the removal of the nut when desired, the locking device being adapted to be used repeatedly without damage either to it or to the other parts.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which Figure 1 is a side elevation of one form of bolt and locking device coöperating therewith;

Fig. 2 is an inside face view of a nut adapted to coöperate with the bolt shown in Fig. 1;

Fig. 3 is a side elevation of the principal parts of the bolt shown in position in the support where it is to be secured, the locking device being set for the connection of the nut;

Fig. 4 is a longitudinal sectional view of the same with the nut tightened and locked;

Fig. 5 is a transverse sectional detail on the broken line 5—5 of Fig. 3;

Fig. 6 is a transverse sectional detail through the nut and bolt on the line 6—6 of Fig. 4;

Figs. 7 and 8 are detail perspective views of the pin and key respectively of the locking device;

Fig. 9 is a side elevation partly in section of a modified form of my improvement, the nut being shown as just started toward its locked position;

Fig. 10 is an end view of the device looking toward the left in Fig. 9;

Fig. 11 is a transverse sectional detail on the line 11—11 of Fig. 9;

Fig. 12 is a longitudinal section on the line 12—12 of Fig. 13 indicating the nut in locked position;

Fig. 13 is a transverse sectional detail on the line 13—13 of Fig. 12;

Fig. 14 is a plan view of another modification of bolt and locking device with the nut in section screwed into place for locking;

Fig. 15 is a vertical longitudinal section of the same on the line 15—15 of Fig. 14, but showing the key projected into locking position; and Fig. 16 is a vertical transverse section on the line 16—16 of Fig. 14.

Referring now to the first set of figures, I show a bolt 20 having a threaded end 21 having longitudinal central keyways or kerfs formed therein in two planes at right angles to each other and intersecting at the central axis of the bolt, these keyways being indicated at 22. At the inner ends the keyways are notched or undercut at 23 to form a temporary catch or holder for the key 24, shown in detail in Fig. 8 and of cruciform shape. The arms of the key project radially from the central hole 25 so as to project slightly beyond the periphery of the threaded portion 21 of the bolt. It will be understood also that the arms of the key are adapted to practically fill those parts of the keyways in which the key lies. In other words, except for the notches 23, the key is not adapted to rotate relatively to the bolt when in position in the keyways.

Another portion of the locking device is a pin 26 which is adapted to be seated at its inner end in a pocket or cavity 27 formed in the axis of the bolt. For convenience of assemblage of the parts, a head 28 may be formed on the end of the pin. Between the head and the key is arranged a spiral spring 29 which tends to project the key outwardly to or beyond the end of the bolt.

The nut 30 is of any suitable or well known form with the exception that it is provided on its inner face at the end of the thread with a series of notches 31 into which the ends of the key arms are adapted to be projected by the spring 29 when the nut is to be locked.

The operation of this form of the invention may be briefly summarized as follows: The bolt is projected through the support, the thickness of which together with one or more washers 32 is sufficient to provide that the threaded end of the bolt beyond the notches 23 will lie beyond the outer face of the support or outermost washer so that the nut may be screwed tightly into place with a wrench or the like if desired. To apply the nut, however, the locking device is introduced and the key is slipped longitudinally of the pin against the force of the spring 29 and then given a slight rotation to cause the arms thereof to interlock in the notches 23, occupying the place shown in Fig. 3. One of the arms of the key may be provided with a groove 33 to effect this rotation by means of a screw driver or similar tool if the key is beyond the reach of the finger nail. After the nut is tightened, the tool will be introduced through one of the keyways 22 so as to rotate the key in the reverse direction, setting it free to be projected by the spring 29 into the notches 31. Since the key is now projected outwardly beyond the notches 23 of the bolt, it is positively held from rotation with relation to the bolt and, therefore, since the ends of the arms of the key project into the nut notches 31, the nut will be positively locked from relative rotation. The unnotched portion of the nut obviously will prevent further outward movement of the key under the force of the spring. The tension of the spring will normally prevent the inward movement of the key. Therefore, by no possibilty can the nut be accidentally loosened or removed. When it is desired to remove the nut, the operator by the use of a screw driver or similar tool will force the key inwardly to the position in Fig. 3, when the nut will be free to be unscrewed and the bolt will be free in turn to be removed from the support.

In the modification shown in Figs. 9 to 13, the bolt 20 is provided with keyways 22 in its threaded end 21 and an axial socket 27, all practically the same as described above. The notches 23, however, are not used in this form of the invention. The key 24, pin 26, and spring 29 may be practically the same as already described.

The nut 34 differs from the nut 30 in that instead of the notches 31 being formed only at the inner surface of the nut, they are cut entirely through longitudinally forming grooves 35 of a size to receive all of the ends of the key arms. The threaded portions of the nut between the adjacent grooves 35 may be regarded as ribs adapted to be slipped along the keyways 22. In other words, this form of the invention contemplates that the nut instead of being rotated or screwed along the threaded portion of the bolt to position, will be pushed bodily by the operator's fingers to the place where it is to be locked, the threaded ribs of the nut slipping freely along the keyways 22 and pushing the key therewith until the nut reaches the support or other obstruction. Then by giving the nut a one-eighth rotation or turn, the threaded ribs of the nut come into binding engagement with the threaded portion of the bolt between adjacent keyways 22. The moment this takes place, the key will be set free to be snapped or shot outwardly by the spring 29. The outer face of the nut at the ends of the grooves 35 are swaged down and inwardly, as indicated at 35ª to provide abutments against which the key 24 might strike to prevent the spring 29 from throwing the key beyond the nut.

As shown in Fig. 9, this invention is adapted particularly for manipulation in connection with a plurality of members to be connected and in which are formed countersunk holes for the head and the nut of the bolt so that there will be no projecting parts when the members are coupled together. In carrying out this form of the invention in practice, I surround the bolt shoulder with a strong spring 36 of any suitable nature, the spring lying between the head of the bolt and the bottom of the counterboard portion of the hole through which the bolt passes. By applying force to the head of the bolt by any suitable jack screw or lever mechanism or any other power devices, the spring may be put under any desired degree of compression for the purpose of introducing the nut into the other counterbore and securing it to the threaded end of the bolt, as above described, and after the nut is fixed in place the power is released from the head of the bolt leaving the spring free to expand and thereby serve to cause the bolt to hold the parts of the structure as firmly together as would be provided for by the force of the spring. The outer face of the nut may be provided with a groove 33' for the purpose of engagement with a screw driver or other tool when the nut is located in a counterbore or cavity as suggested in Fig. 9 for the purpose of threading it.

In the last three figures, I show a bolt 20' having a keyway 22' having its axis eccentric to, but parallel with the axis of the bolt. The inner end of the keyway constitutes a socket 27 into which the shank portion 26' of the key 24' is adapted to project. This shank portion of the key is surrounded by the coil spring 29 which, as before described, tends to project or shoot the key outwardly toward the end of the bolt into locking position. The operation of this form of the invention is very similar to that of Figs. 1 to 8, in that the keyway is provided with a notch 23 at its inner end into which the laterally projecting lug 24ª of the key 24' is adapted to project to temporarily hold the key in retracted position against the force of the spring, see Fig. 14. The end of the key also is provided with a groove or kerf 33 for the application of a screw driver or the like to manipulate the same. The nut 30' is similar to that shown in Fig. 2 and may be provided with any suitable number of notches 31, into any one of which, the lug 24ª of the key is adapted to interlock to lock the nut.

I claim:

1. The combination with a bolt having a longitudinal cruciform key seat formed in its threaded end and intersecting the bolt thread and a nut coöperating with the bolt around its key seat, of a cruciform key in said key seat, said key being movable longitudinally of the bolt and projecting radially through said key seat into interlocking engagement with the threaded part of the nut.

2. The combination with a bolt having a longitudinal key seat formed in its threaded end, said key seat being formed with a laterally projecting notch adjacent to the lower end of the key seat, the bolt also being provided with a pocket extending longitudinally thereof below the notch, of a key located in the key seat and rotatable therein around its axis to interlock in said notch, guide means for the key projecting into said pocket, and an actuating spring for the key surrounding said guide means in the pocket.

3. The combination with a bolt having a longitudinal key seat formed in its threaded end, said key seat being provided with a laterally projecting notch adjacent to its lower end, of a key movable longitudinally of the bolt in said key seat and adapted to interlock temporarily in said notch, and means acting upon the key tending to force it upwardly along the key seat, the upper face of the key being provided with a groove to control the rotation of the key and its coöperation with said notch.

4. The combination with a bolt having a longitudinal cruciform key seat formed in its threaded end, each portion of the key seat being extended laterally forming a notch, of a cruciform key movable longitudinally along the key seat and rotatable to cause all of its arms to interlock in the several key seat notches, said key having a central hole, a guide pin disposed centrally of the key seat and projecting through said key hole, and a spring surrounding the guide pin and acting upon the key tending to force it toward the end of the bolt.

WILLIAM ALOYSIUS HUBENER.

Copies of this patent may be obtained for five cents each, by addressing the "Commissioner of Patents, Washington, D. C."